US009659421B2

(12) United States Patent
Boles et al.

(10) Patent No.: US 9,659,421 B2
(45) Date of Patent: May 23, 2017

(54) VIRTUAL SECURITY GUARD

(71) Applicant: Automated Security Integrated Solutions, LLC, Houston, TX (US)

(72) Inventors: Samantha Boles, Huffman, TX (US); Jeff Kwiatkowski, Spring, TX (US)

(73) Assignee: AUTOMATED SECURITY INTEGRATED SOLUTIONS, LLC, Houston, TX (US)

( * ) Notice: Subject to any disclaimer, the term of this patent is extended or adjusted under 35 U.S.C. 154(b) by 0 days.

(21) Appl. No.: 14/792,080

(22) Filed: Jul. 6, 2015

(65) Prior Publication Data
US 2017/0011571 A1 Jan. 12, 2017

(51) Int. Cl.
*G07C 9/00* (2006.01)
(52) U.S. Cl.
CPC ..... *G07C 9/00126* (2013.01); *G07C 9/00071* (2013.01); *G07C 9/00103* (2013.01); *G07C 9/00166* (2013.01)
(58) Field of Classification Search
None
See application file for complete search history.

(56) References Cited

U.S. PATENT DOCUMENTS

| 5,373,664 A | 12/1994 | Butler |
| 8,254,631 B2 | 8/2012 | Bongard |
| 8,558,887 B2 | 10/2013 | Plaster |
| 8,710,955 B2 | 4/2014 | Teti et al. |
| 2011/0292214 A1 | 12/2011 | Plaster |
| 2012/0188054 A1 | 7/2012 | Bongard |
| 2014/0156524 A1* | 6/2014 | Ruud ................. G06Q 20/3224 705/42 |
| 2014/0365359 A1* | 12/2014 | Wilson .................. G06Q 10/02 705/39 |

OTHER PUBLICATIONS

"Reduce security costs with ASIS Virtual Guard program", Published Feb. 24, 2014, video uploaded to YouTube by Automated Security Integrated Solutions, <https://www.youtube.com/watch?v=JLZDaeAdrAk>.
"Virtual Guards", Automated Security Integrated Solutions, Published as of Mar. 1, 2014, printed on Jan. 10, 2016, 281.661.ASIS.
"Providing solid solutions for your security needs", Automated Security Integrated Solutions, Published as of Mar. 1, 2014, printed on Jan. 10, 2016, 281.661.ASIS.

* cited by examiner

*Primary Examiner* — Daniell L Negron
(74) *Attorney, Agent, or Firm* — Jones Day

(57) ABSTRACT

Systems and methods are provided for remotely controlling access of vehicles into and out of a secured area. At a kiosk located at the point of entry into the secured area, information for identifying a vehicle and/or its driver are obtained via input devices at the kiosk and stored at a remote operations center. While a vehicle is inside the secured area, the stored information may be viewed, modified, and/or supplemented. Once a vehicle is authorized to exit the secured area, an electronic indication is received at the operations center. At a kiosk located at the point of exit from the secured area, identifying information pertaining to the vehicle and/or driver is again obtained. The information is verified at the operations center to ensure a sufficient match with identifying information for the vehicle and/or driver previously stored, before the operation center transmits a signal allowing the vehicle to exit.

30 Claims, 6 Drawing Sheets

VIRTUAL SECURITY GUARD

FIELD

The technology described in this patent document relates generally to security systems and methods to effectively and efficiently control access into and out of secured areas, and in particular, access of commercial vehicles into and out of secured facilities.

BACKGROUND

The need for efficient and effective control of access into and out of secured areas spans various industries and purposes. For example, gated residential communities need access control systems to regulate the safe entrance and exit of vehicles and persons to and from the residential communities. Commercial sites also need access control systems to regulate the entrance and exit of employees, visitors, delivery persons, shipping trucks, and other entities to and from the sites.

Conventional access control systems and methods have existed in various forms. A manual system may consist of an on-site security station staffed by a human attendant. Vehicles seeking to enter or exit a secured area are stopped at the point of entry or exit and manually screened by the attendant. Conventional access control systems also include automated systems. An automated system may consist of a kiosk or like device positioned at or nearby a security barrier. If an input from a vehicle is accepted by the kiosk, it is programmed to automatically deactivate the security barrier, thus permitting the vehicle to proceed into or out of the secured area. Manual systems provide for a large amount of flexibility in controlling entrance and exit of persons and vehicles, due to the human attendant's ability to make decisions and resolve abnormal or unexpected situations. Manual systems are also less susceptible to fraud and deception, as humans are generally more difficult to trick or circumvent than a programmed computer. Manual systems, however, may be prone to human error on the part of the human attendant. They are also generally more expensive, as the human attendants are typically paid wages for their work. Sites with a high volume of vehicles entering and exiting often require multiple human attendants. On the other hand, automated systems can be less expensive than manual systems due to the reduced need for paid human attendants. Automated systems are not as prone to human error, but they may suffer from mechanical malfunctions. Automated systems are also more prone to fraud and deception. For example, access cards may be duplicated and used by unauthorized persons.

In certain industries, such as the manufacturing, distribution, and warehousing industries, a site often experiences a large volume of persons and vehicles entering and exiting the site on a daily basis. A substantial amount of the vehicular traffic consists of trucks entering a secured area within the site to deliver or pick up shipments of goods as well as trucks exiting the secured area after they have delivered or picked up goods. It is desirable for owners of such sites to oversee and track their inventories of goods as well as the vehicles that are permitted to enter and exit the secured areas. These sites have a heightened need for security not only inside the secured areas, but also for vehicles and goods and persons inside the vehicles traveling in and out of the secured areas. Owners of sites that house valuable things or sensitive information may wish to be selective about which persons or vehicles are allowed to enter, and may wish to carefully control all entry and exit from the site. For example, rules recently promulgated by the Transportation Security Administration have required operators of any site holding air cargo to obtain facial and photo identification of all persons entering the site. It is thus desirable for security information to be checked and collected in an effective manner through the access control process.

Owners of manufacturing, distribution, or warehousing sites may also desire to maintain careful oversight over commercial vehicles and their drivers while the vehicles are inside a secured location of the site. The various drivers of commercial vehicles are often employed by different companies. At some sites, a single vehicle may enter and exit a secured area multiple times in one day. Trucks sometimes deliver cargo in one trailer upon entry, and pick up cargo in a different trailer before exiting. It is desirable for the owner of such a site to effectively track the cargo being unloaded from vehicles inside the secured area and the cargo loaded onto vehicles for shipment out of the site, and ensure that departing drivers are in possession of the correct vehicles and carrying the correct cargo. It is desirable for the site owner to regulate when vehicles that have been loaded with cargo (or that have had their cargo unloaded) are permitted to leave, and should leave, secured areas, especially for the commercial drivers who are not employed by the site owner and have no other affiliation with the site. An operator's inadequate control over a timely exit procedure may allow vehicles to linger in a secured area longer than necessary, resulting in increased chances for theft, unauthorized behavior, or mistake. Therefore, it is desirable for a site owner to ensure that vehicles minimize their time inside secured areas only to the necessary duration, for greater safety and security.

The present invention addresses the identified needs and deficiencies in the prior art by providing systems and methods for remotely controlling access of vehicles into and out of secured areas. Such systems and methods may include some automation but still allow for manual control and oversight by humans. In doing so, control of a vehicle into and out of a secured area can be efficiently maintained while increasing security of vehicles, drivers, and cargo inside and outside of the secured area.

SUMMARY

The instant invention for a virtual security guard provides systems and methods for remotely controlling access of a vehicle into and out of a secured area.

In one embodiment, the invention pertains to a system for controlling access of a vehicle into and out of a secured area. The system comprises an entry kiosk coupled to a security barrier controlling entry into the secured area and an exit kiosk coupled to a security barrier controlling exit from the secured area. During entry, a communications unit in the entry kiosk transmits, to a remote entity via a communication network, a request to enter the secured area and identifying information associated with the vehicle. The remote entity grants entry by sending an electronic signal to the communications unit in the entry kiosk, upon which the security barrier is deactivated. During exit, a communications unit in the exit kiosk transmits, to the remote entity via the communication network, a request to exit the secured area and identifying information associated with the vehicle. The remote entity comprises a processor that is configured to receive, over the communication network, an electronic signal approving the vehicle to exit. The remote entity also determines that the identifying information associated with the vehicle collected during entry matches the identifying information associated with the vehicle collected during exit. The remote entity grants exit by sending an electronic signal to the communications unit in the exit kiosk, upon which the security barrier is deactivated.

In another embodiment, the invention pertains to a method of remotely controlling access of a vehicle into and out of a secured area. A vehicle seeking entry into a secured area transmits a request to enter and identifying information to a remote entity via an entry kiosk and over a communication network. The remote entity stores the identifying information. The remote entity grants entry by sending an electronic signal to the communications unit in the entry kiosk, upon which a security barrier controlling entry into the secured area is deactivated. A vehicle seeking exit from the secured area transmits a request to exit and identifying information to the remote entity via an exit kiosk. The remote entity determines that an electronic signal approving the vehicle to exit has been received over the communication network. The remote entity also determines that the identifying information associated with the vehicle collected during entry matches the identifying information associated with the vehicle collected during exit. The remote entity grants exit by sending an electronic signal to the communications unit in the exit kiosk, upon which a security barrier controlling exit from the secured area is deactivated.

In a further embodiment, the invention pertains to a system for controlling access of a vehicle into a secured area and controlling exit from the secured area using an exit token configured for a single use. The system comprises an entry kiosk coupled to a security barrier controlling entry into the secured area and an exit kiosk coupled to a security barrier controlling exit from the secured area. During entry, a communications unit in the entry kiosk transmits, to a remote entity via a communication network, a request to enter the secured area and identifying information associated with the vehicle. The remote entity grants entry by sending an electronic signal to the communications unit in the entry kiosk, upon which the security barrier is deactivated. The remote entity comprises a processor that is configured to store the identifying information, receive credentials associated with an exit token, associate the identifying information with credentials of the exit token, generate an indication of approval to exit associated with the credentials, and remove the indication of approval of exit associated with the credentials upon use of the exit token. The exit kiosk comprises a memory to store the indication of approval to exit associated with the credentials of the exit token. The exit kiosk also comprises an exit token reader configured to read an exit token of a driver of the vehicle seeking to exit the secured area. The exit kiosk further comprises a control mechanism configured to deactivate the security barrier upon determining that the credentials of the read exit token correspond to the credentials for which an associated indication of approval to exit has been stored.

In yet another embodiment, the invention pertains to a method for remotely controlling access of a vehicle into a secured area and controlling exit from the secured area using an exit token configured for a single use. A vehicle seeking entry into a secured area transmits a request to enter and identifying information to a remote entity via an entry kiosk and over a communication network. The remote entity stores the identifying information. The remote entity grants entry by sending an electronic signal to the communications unit in the entry kiosk, upon which a security barrier controlling entry into the secured area is deactivated. The remote entity receives credentials of an exit token and associates the identifying information with the credentials. The remote entity generates an indication of approval to exit associated with the credentials. The remote entity then transmits, over the communication network, the indication of approval to exit associated with credentials for storage at an exit kiosk, such that a security barrier coupled to the exit kiosk is deactivated when credentials of an exit token read by an exit token reader correspond to credentials for which an indication of approval to exit has been stored. The remote entity then removes the indication of approval to exit associated with the credentials to prevent future use of the exit token.

BRIEF DESCRIPTION OF THE DRAWINGS

The invention may take form in various components and arrangements of components. The drawings are only for the purposes of illustrating the preferred embodiments and are not to be construed as limiting the invention.

DETAILED DESCRIPTION

Systems and methods are described in which virtual security guard systems and methods are used to control a vehicle's access into and out of a commercial site where goods are routinely delivered and picked up by drivers not employed by or affiliated with the operator of the site. At the point of entry into a secured area, information for identifying a vehicle and/or its driver are obtained via various cameras, readers, and other input devices at an entry kiosk, before the vehicle is permitted to enter. Identifying information may consist of information including photographs of the driver and of the vehicle, identification data, license plate numbers, trailer numbers, and vehicle weights. The information obtained is stored at a remote operations center and may be viewed by operators in the operations center. While a vehicle is inside the secured area, the stored information may be verified, modified, or supplemented by site personnel located inside the secured area. Once a vehicle is authorized to leave the secured area, site personnel electronically transmit to the operations center an authorization to exit. At the point of exit from the secured area, identifying information is again obtained via input devices at an exit kiosk. The obtained information is verified at the operations center to ensure the information matches with identifying information previously stored, before the vehicle is permitted to exit.

Figure 1:
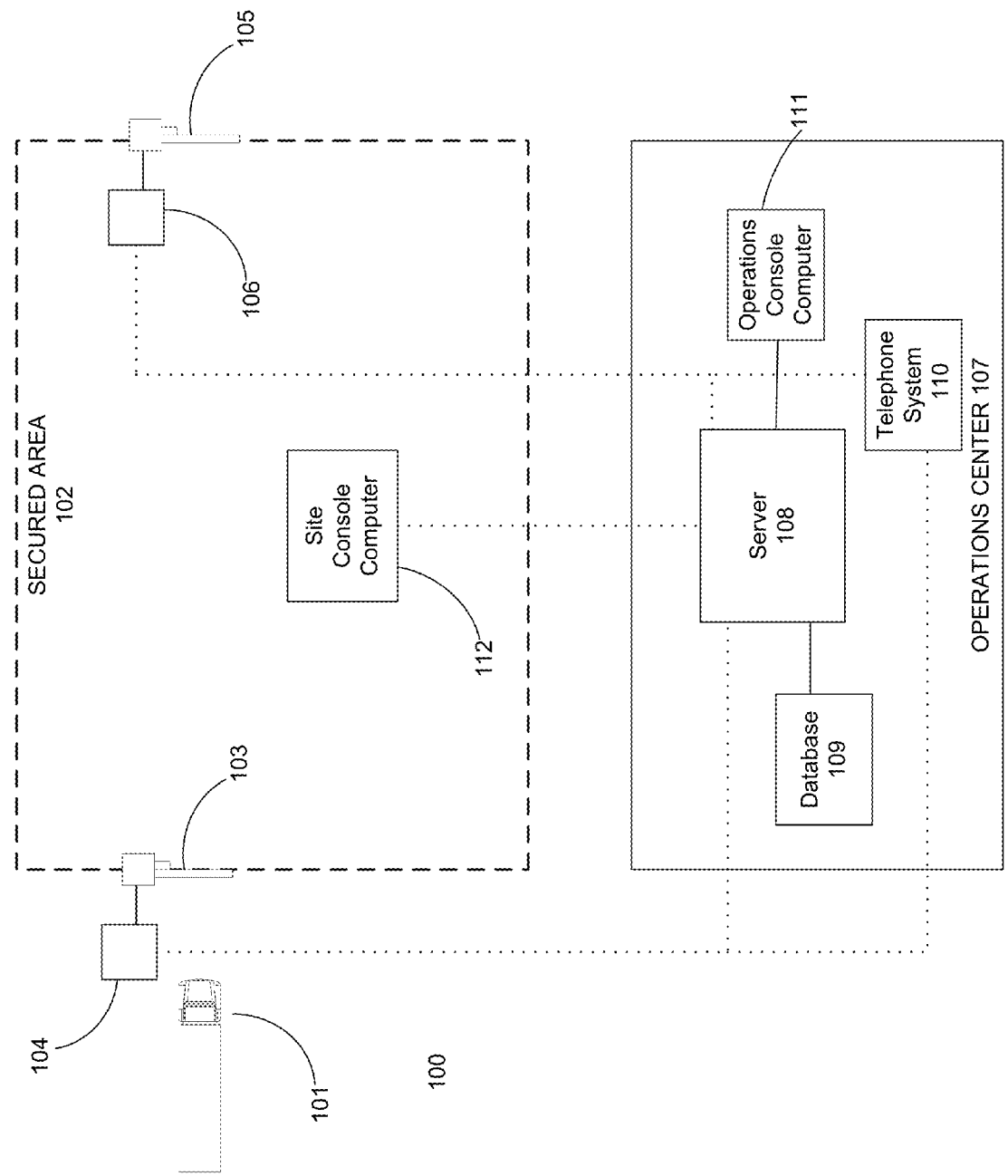
FIG. 1 is a diagram depicting an exemplary site where access into and out of a secured area is controlled remotely by a virtual security guard system.

FIG. 1 is a diagram of the virtual security guard system implemented at a site 100. The system is used to control access of a vehicle 101 into a secured area 102 within the site, or access of the vehicle 101 out of the secured area 102, or both. A security access barrier 103 is positioned at the point of entry into the secured area. An entry kiosk 104 is positioned outside of the secured area 102 in proximity to security access barrier 103. Entry kiosk 104 is electronically connected to security access barrier 103, such as through conventional electrical wiring. An additional security access barrier 105 is positioned at the point of exit from secured area 102. Exit kiosk 106 is positioned inside of the secured area 102 in proximity to security access barrier 105. Exit kiosk 106 is electronically connected to security access barrier 105. Site 100 may optionally contain additional security barriers, entry kiosks, and exit kiosks to accommodate a high flow of traffic into and out of secured area 102. Security access barrier 105 may be one of various systems available in the field, such as a barrier arm system, a security gate system, or an overhead door system.

A operations center 107 is located remote from secured area 102. The operations center 107 acts as the hub for managing the system and controlling access into and out of secured area 102. After identifying information pertaining to vehicle 101 and/or the driver of vehicle 101 is collected, it is sent to operations center 107 for storage and access control purposes. In the described embodiment, operations center 107 is located outside of the secured area 102 and site 100 entirely. A single operations center can serve as a hub for remotely controlling access into and out of secured areas in more than one site. In alternative embodiments, operations center 107 may be located away from the points of entry and exit of secured area 102 but still inside secured area 102. As another alternative, operations center 107 may be located outside secured area 102 but still within site 100.

As shown in FIG. 1, the virtual security guard system is configured with both hardware and software. Access control software (not shown) runs on server computer 108 to facilitate detailed tracking of information pertaining to the vehicles and drivers entering and exiting secured area 102. In one embodiment, the access control software is a web-based application running on a web server. Database 109 is located in operations center 107 and serves as a repository for the tracked information, and is connected to server computer 108. The information in database 109 is stored and accessed via server 108. Alternatively, database 109 may be located in a different physical location from operations center 107, or it can be located in a cloud-based storage. Server 108 communicates with entry kiosk 104 and exit kiosk 106 via a wide area network connection, such as the Internet. From inside secured area 102, the access control application may be accessed from site console computer 112, via the Internet. Telephone system 110 facilitates voice communications between operators stationed in operations center 107 and drivers at entry kiosk 104 or exit kiosk 106, which are conducted over a public switched telephone network (PSTN). In alternative embodiments, server 108 may communicate with entry kiosk 104, exit kiosk 106, and site console computer 112 via a private network or a local area network. In another embodiment, a Voice over IP (VoIP) communication network may be used for voice communications instead of the PSTN, in which case the communications from entry kiosk 104 and exit kiosk 106 are transmitted to and received from server 108 over the Internet.

In operations center 107, a web-based user interface into the access control application running on server computer 108 is provided at operations console computer 111. Through the user interface, an operator stationed in the operations center 107 can access the application to monitor vehicles seeking to enter or exit the secured area 102; collect identifying information pertaining to vehicle 101, the driver of vehicle 101, and/or cargo associated with vehicle 101; and control entry and exit of vehicle 101. Through the application, the operator may view identifying information obtained at the entry or exit kiosks as soon as the information is transmitted to the operations center 107, modify such information, and retrieve stored identifying information from database 109 as needed for use in controlling the entry or exit process. More than one human operator and operations console 111 may be used in sites where the amount of vehicular traffic entering and exiting the secured area 102 is high.

Inside secured area 102, a web-based user interface into the access control application is provided at site console computer 112. Through console computer 112, site personnel stationed in secured area 102 can store and update information pertaining to vehicles, persons, or cargo, as well as provide authorization of a vehicle 101 to exit the secured area 102. In connection with providing authorization of a vehicle to exit, the site personnel may optionally provide the driver of a vehicle ready to depart secured area 102 with an exit token capable of being used a single time to exit the secured area 102 at exit security barrier 106. The exit token may be a RF-based proximity card manufactured by HID Global or other like access cards or devices available in the field.

Figure 2:
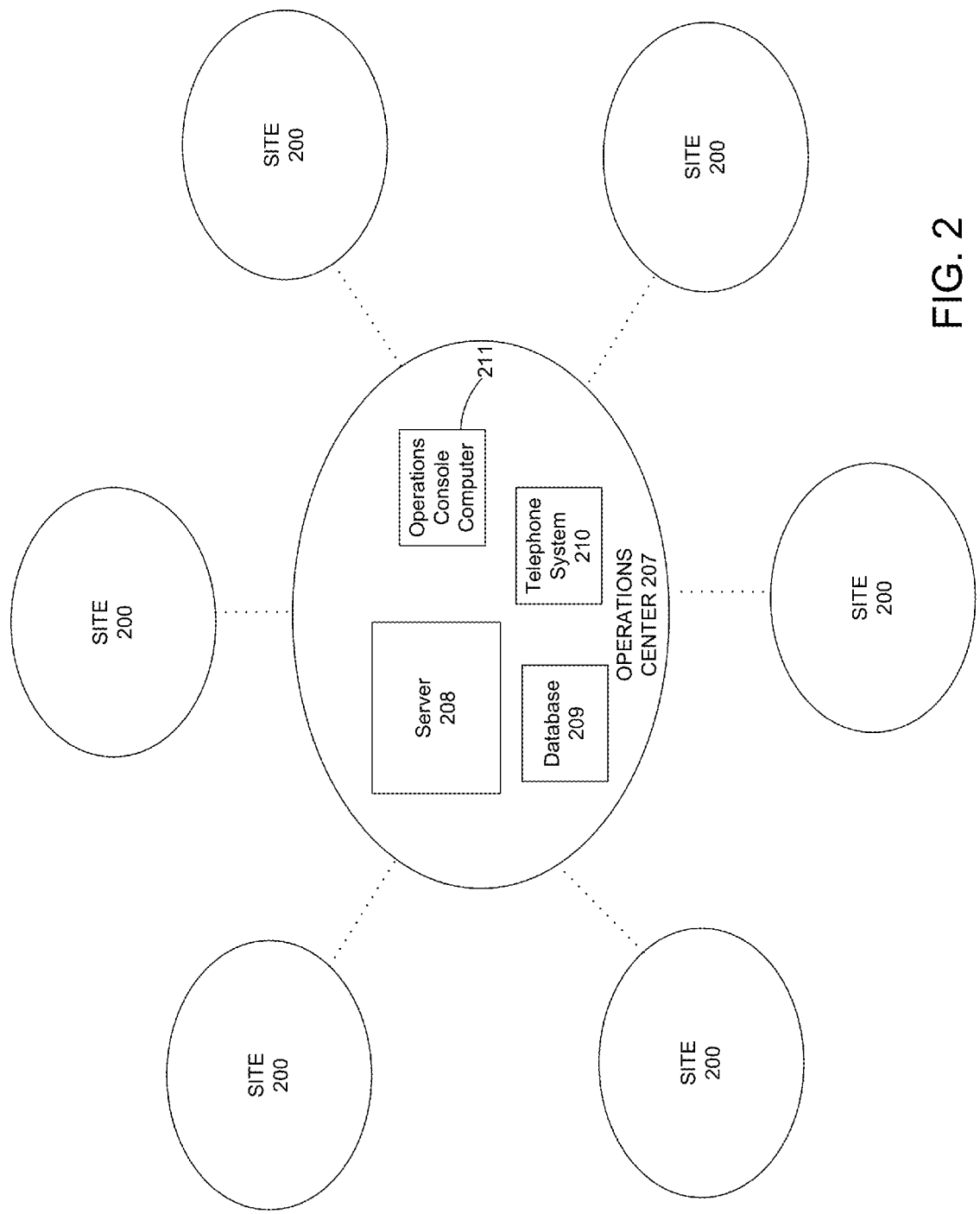
FIG. 2 is a diagram depicting an exemplary arrangement of multiple sites where access into and out of secured areas in the sites is controlled remotely by a virtual security guard system.

As shown in FIG. 2, the virtual security guard system may be implemented at multiple sites 200 connected to a single operations center 207. An operator stationed in the operations center 207 may, via operations console 211, simultaneously oversee and control access into and out of any of sites 200. Server 208 communicates with the exit and entry kiosks in sites 200, and database 209 connected to server 208 serves as a repository for information pertaining to drivers and vehicles of sites 200. A user interface into the access control application is provided at operations console computer 211, and allows the operator to toggle between sites. The multi-site implementation depicted in FIG. 2 provides a cost-effective solution for access control management, as only a single operations center is needed to manage multiple sites simultaneously. The quantity of hardware, equipment, and operators is thereby reduced.

Figure 3:
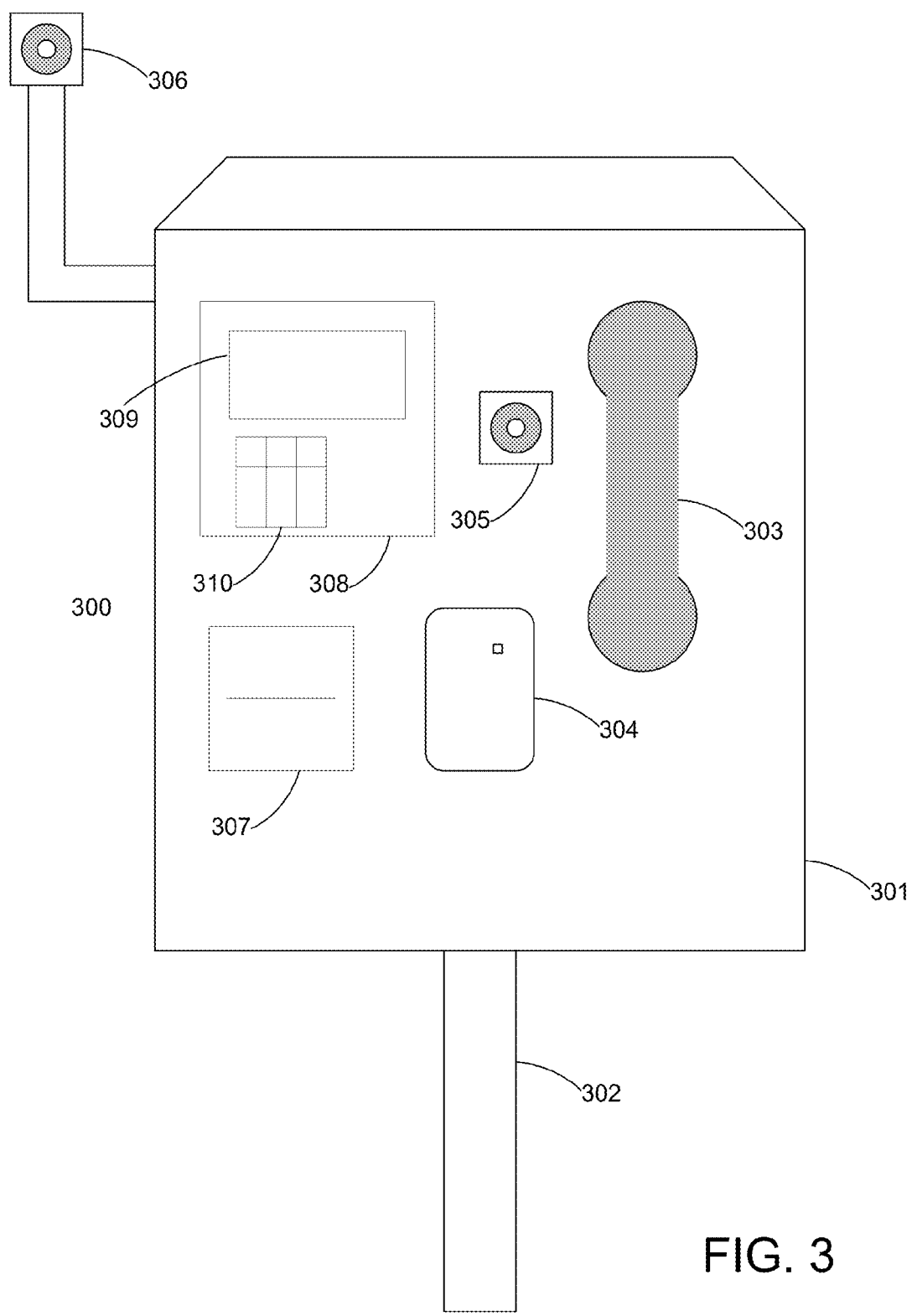
FIG. 3 is an example of a kiosk used in the virtual security guard system.

FIG. 3 depicts an exemplary kiosk 300 of the virtual security guard system. Kiosk 300 can serve as either an entry kiosk 104 or an exit kiosk 106 for a secured area 102. Kiosk 300 consists of a housing 301 and a base 302 for mounting the kiosk onto a concrete or earthy surface. Preferably, a durable and corrosion resistant housing 301 is used. Base 302 serves as an enclosure for power cables for powering the components contained in kiosk 300. Base 302 also serves as an enclosure for physical wiring extending from kiosk 300, such as wiring connecting the kiosk 300 to a security barrier, telephone wiring connecting the kiosk to the PSTN, or wiring providing data access into a wide area network.

Telephone handset 303 is mounted on the front face of kiosk 300. Together with a telephone system (not shown) installed inside kiosk 300, handset 303 is used by a driver of a vehicle to communicate with the operations center. The telephone system inside kiosk 300 may be configured to automatically initiate a call to the operations center upon the handset being picked up. Other means of audio input and output for communications may be used at kiosk 300, such as a microphone and speaker system attached to kiosk 300. In the described embodiment, voice communications are transmitted between the kiosk to the operations center via the PSTN; however, they may also be transmitted over the Internet or other data network using a VoIP system installed inside kiosk 300.

RF reader 304 is mounted on the face of kiosk 300 and is used to read RF-based cards or badges. RF reader 304 may be a proximity card reader manufactured by HID Global, or other like RF readers available in the field. RF reader 304 is connected to a security barrier nearby kiosk 300. RF reader 304 is connected to a memory for storing credentials of RF cards. Upon being presented with an RF card whose credentials are stored in the memory and are authorized, RF reader 304 can be programmed to send a signal to the security barrier and cause the security barrier to be deactivated, thereby permitting a vehicle to pass through. The RF reader 304 is connected to the operations center via the kiosk 300, thereby permitting the operations center to remotely update the card credentials stored in the memory connected to RF reader 304.

Also mounted on the kiosk 300 are cameras 305 and 306. Camera 305 is a video camera used to capture video or still images of a driver's face in the vicinity of kiosk 300. Camera 305 may be controlled remotely by an operator in the operations center, or alternatively, camera 305 may be programmed to capture images upon a command received from the driver, such as the push of a button. Camera 306 is mounted on an extension arm connected kiosk 300, and is used for capturing video and photographs of the vehicle. Camera 306 is a pan-tilt-zoom camera that can be controlled by the operator in the operations center. Camera 306 is used to capture video or still images of identifying information pertaining to the vehicle, such as words or numbers appearing on the side of the vehicle and container identification numbers imprinted on the side of a vehicle container. Video and images from cameras 305 and 306 are transmitted from kiosk 300 to the operations center via the Internet.

Additional cameras (not shown) are installed in the vicinity of kiosk 300 but are not attached to kiosk 300 itself. One such camera may be positioned nearby kiosk 300 to be able to capture images of a front license plate of a vehicle approaching kiosk 300. Another camera may be positioned to be able to capture images of a rear license plate of the vehicle and/or a trailer identification number imprinted on the rear of a trailer of the vehicle. Another camera may be mounted on a pole nearby kiosk 300 and is positioned to capture images of the top of the vehicle or trailer. The additional cameras are connected to the kiosk 300 via a wired or wireless connection, and video and images from the additional cameras are transmitted from kiosk 300 to the operations center via the Internet.

Card reader 307 is located on kiosk 300 and is used to read information from an identification card of a driver. In one embodiment, card reader 307 is a magnetic stripe reader configured to read the magnetic stripe of a driver's license or other card containing a magnetic stripe. Identification data read by card reader 307 is transmitted through the kiosk 300 to the operations center. In another embodiment, card reader 307 contains a slot in which a driver's license or other identification card may be inserted, along with a digital camera inside to capture a photograph of the identification card once it inserted into the slot. In yet another embodiment, card reader 307 contains a digital scanner configured to scan text and photographs on an identification card that is inserted into the reader. The use of a camera or scanner in addition to, or in lieu of, a magnetic stripe reader may be advantageous by allowing photographs or other information imprinted on the face of an identification card (that would otherwise not be present in a magnetic stripe) to be captured and transmitted to the operations center.

The kiosk 300 also includes a user interface 308. which consists of a display 309 and keypad 310, and are provided to facilitate additional communication between a driver of a vehicle and the operations center. In one embodiment, the display 309 is preprogrammed to display messages to the driver and prompt the driver to input identifying information pertaining to the driver and/or the vehicle. For example, when a vehicle is seeking to enter a secured area (or when a vehicle is seeking to exit the secured area), display 309 displays a message to a driver of the vehicle prompting the driver to input his name and employer name using keypad 310. The driver is also prompted to indicate whether he is delivering cargo to the secured area, picking up cargo from the secured area, both, or neither. If the vehicle is carrying cargo, the driver is prompted to indicate the nature of the cargo. The display 309 may be programmed to display instructions to the driver based on information input by the driver, such as instructions to report to a specific location inside the secured area or outside the secured area. The display 309 may be programmed to display reminders to the driver, such as to wear a seat belt or to ensure that a GPS tracking device in the vehicle is present and properly activated.

In addition to the cameras and readers described above, a number of other input devices available in the field may be used with kiosk 300 for collecting information for identifying a vehicle and/or a driver. These devices may include, for example, smart card readers to read information from a smart card in the possession of a driver; bar code readers to read a bar code imprinted on a card in possession of a driver or a bar code imprinted on the vehicle itself; scales to measure the weight of the vehicle, and biometric devices to read the fingerprints, eyes, face, or voice of a driver.

Figure 4:
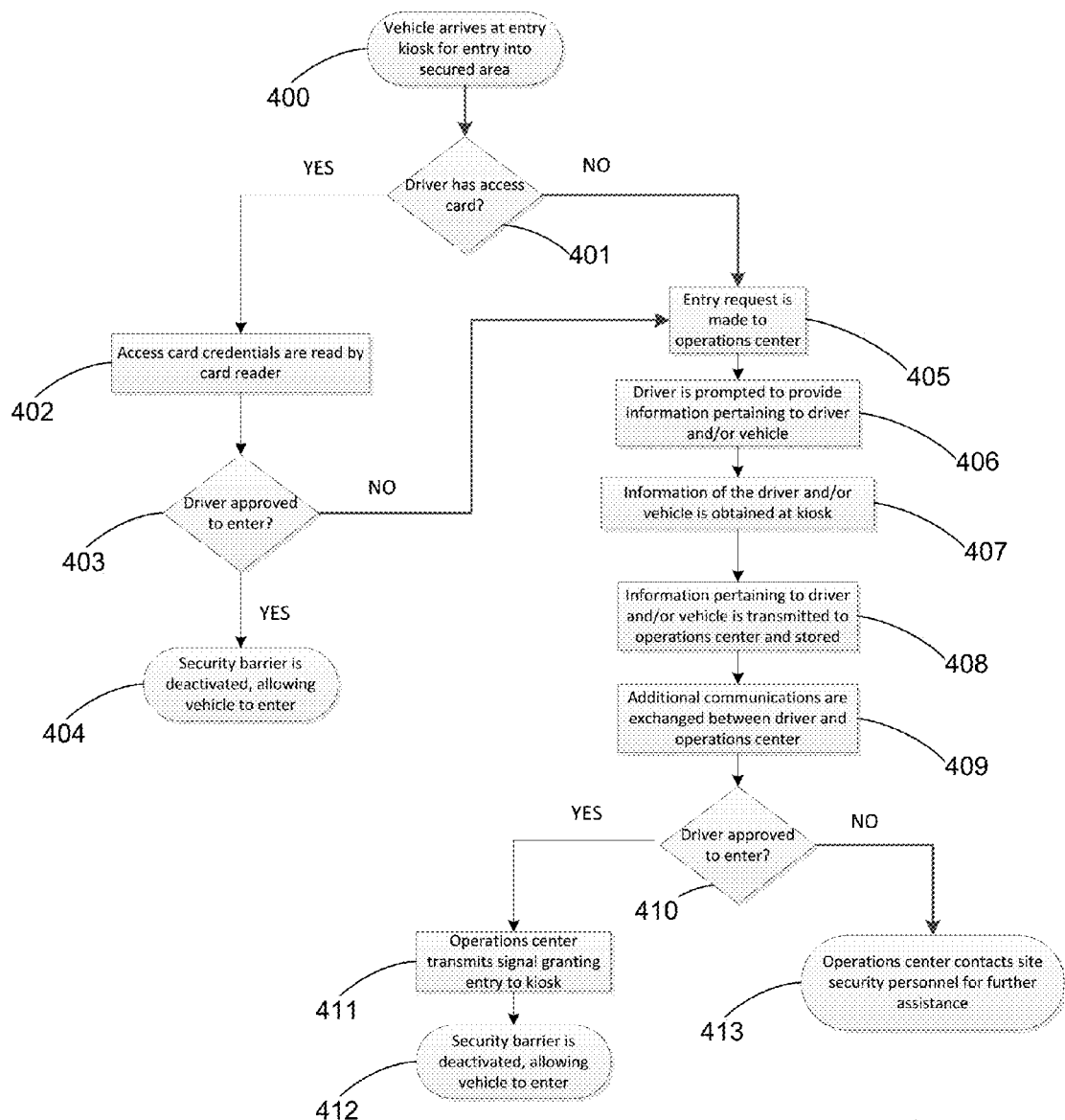
FIG. 4 is a flow diagram depicting a method for controlling entry into a secured area.

A method of remotely controlling entry of a vehicle into a secured area is described with reference to FIG. 4. At step 400, a vehicle seeking entry into the secured area arrives an entry kiosk. At the time of the vehicle's arrival, a security barrier connected to the entry kiosk is activated, thereby preventing the vehicle from proceeding further. If, in step 401, the driver possesses an access card, in step 402, the driver may directly submit the access card to be read by the RF reader mounted on the entry kiosk. In step 403, a determination is made by the RF reader whether the access card is approved for entry into the secured area. If so, in step 404, the RF reader initiates a signal to deactivate the security barrier connected to the entry kiosk, thereby allowing the vehicle to proceed into the secured area.

If, in step 403, the RF reader determines that the access card is not approved for entry, the driver of the vehicle is required to make a request for entry to the operations center in step 405. A driver is similarly required to make a request for entry to the operations center if, in step 401, the driver does not possess an access card that can be read by the entry kiosk's RF reader. A request for entry of a vehicle may be made in a number of ways. In one embodiment, a request is made when the driver of the vehicle picks up the telephone handset mounted on the kiosk and initiates a telephone call to the operations center. Alternatively, a request for entry is made by an input from the keypad on the kiosk, swipe of an identification card in the card reader embedded in the kiosk, or voice transmission over a speaker connected to the kiosk. In another embodiment, the kiosk may include a motion detector, and a request for entry is automatically made to the operations center when the motion detector senses an approaching vehicle. In yet another embodiment, the kiosk is connected to an inductive loop detector, pneumatic road tube, or other sensor installed beneath the road surface adjacent to the kiosk. A request for entry is automatically made to the operations center when an approaching vehicle above the road surface is sensed.

Upon the request for entry being made, the driver is prompted in step 406 to provide various identifying information pertaining to the driver and/or the vehicle via the various cameras, readers, and other input devices described above, with reference to FIG. 3. As an example, the driver is prompted to face camera 305 so that an image of the driver's face can be captured, and the driver is also prompted to insert the driver's identification card into card reader 307. In step 407, desired information is obtained by the respective input device at the entry kiosk. In step 408, the obtained information is transmitted to server 108 in the operations center for storage into database 109. Each record in database 109 contains a driver's name and various information obtained for that driver, such as license plate number of the driver's vehicle and the trailer identification number of a trailer of the vehicle. For some types of identifying information received at server 108, the access control application may be programmed to store the information directly into database 109. For other types of information, the access control application can be configured to display the information to an operator at operations console 111, after which the operator would manually enter the information into database 109. For example, upon receiving an image of the license plate of a vehicle captured at an entry kiosk at server 108, the image is displayed to a operator at an operations console computer. The operator visually determines the license plate number from viewing the image and inputs the license plate number to be stored in the appropriate record in database 109. Alternatively, the license plate number could be automatically determined by server 108 using optical character recognition and stored into database 109.

The prompting of a driver at a kiosk to provide identifying information pertaining to the driver and/or vehicle may be conducted manually by an operator in the operations center through voice communications with the driver. Alternatively, the prompting of the driver may be automated by preprogrammed voice commands or messages on display 309 on the kiosk. Automated prompting can be advantageous to reduce the workload and demand on human operators staffed in the operations center. However, involvement of an operator to prompt the driver for information allows for more flexibility and precision in obtaining the desired information. For example, should the driver's face be positioned too far from camera 305, the operator can instruct the driver to move closer to camera 305 in order to obtain a higher quality image for use in identification purposes. Various embodiments are possible which combine preprogrammed, automated aspects with manual aspects conducted by human operators. As an example, in one embodiment, upon the initiation of a request for entry, a driver is first prompted via an automated message on display 309 to insert an identification card into card reader 307. Once the driver has inserted an identification card and the identification data on the identification card is obtained and transmitted to the operations center, the operator at the operations center manually controls cameras 305 and 306 to capture images of the driver's face, images of the vehicle, and other information. Through the combined use of automation and human control, efficiency and accuracy in the information collection process can be achieved.

Identifying information pertaining to a vehicle and/or driver may also be obtained through the input devices connected to entry or exit kiosk without any prompting of the driver. For example, camera 306 may be used capture an image of the vehicle stopped at a kiosk without any action on the driver's part. Similarly, cameras installed in the vicinity of the kiosk can automatically capture images of the license plates of the vehicle without any action on the driver's part. A scale positioned adjacent to a kiosk, such that an approaching vehicle is forced to travel over the scale, can measure the weight of the vehicle and its contents. Any such information collected is transmitted through the kiosk to server 108 in the operations center for storage into database 109.

In step 409, additional communications are exchanged between the driver of the vehicle and the operations center. These communications can be exchanged electronically through the user interface 308 of the kiosk 300 or they may be transmitted by voice communication. In one example, the driver is prompted to provide information regarding the name of the driver's employer; an indication of whether the driver is delivering cargo to the secured area, picking up cargo from the secured area, both, or none; and an indication of the nature of any such cargo. This additional information is optionally stored in database 109 in the record for the driver. Based on information provided by the driver, the operations center can provide instructions to the driver to report to a specific location within the secured area.

In step 410, a determination is made at the operations center of whether the vehicle is permitted to enter the secured area. If so, in step 411, the operations center transmits a signal to the kiosk indicating that entry is granted. In step 412, the kiosk causes the security barrier to be deactivated, permitting the vehicle to enter the secured area.

Figure 5:
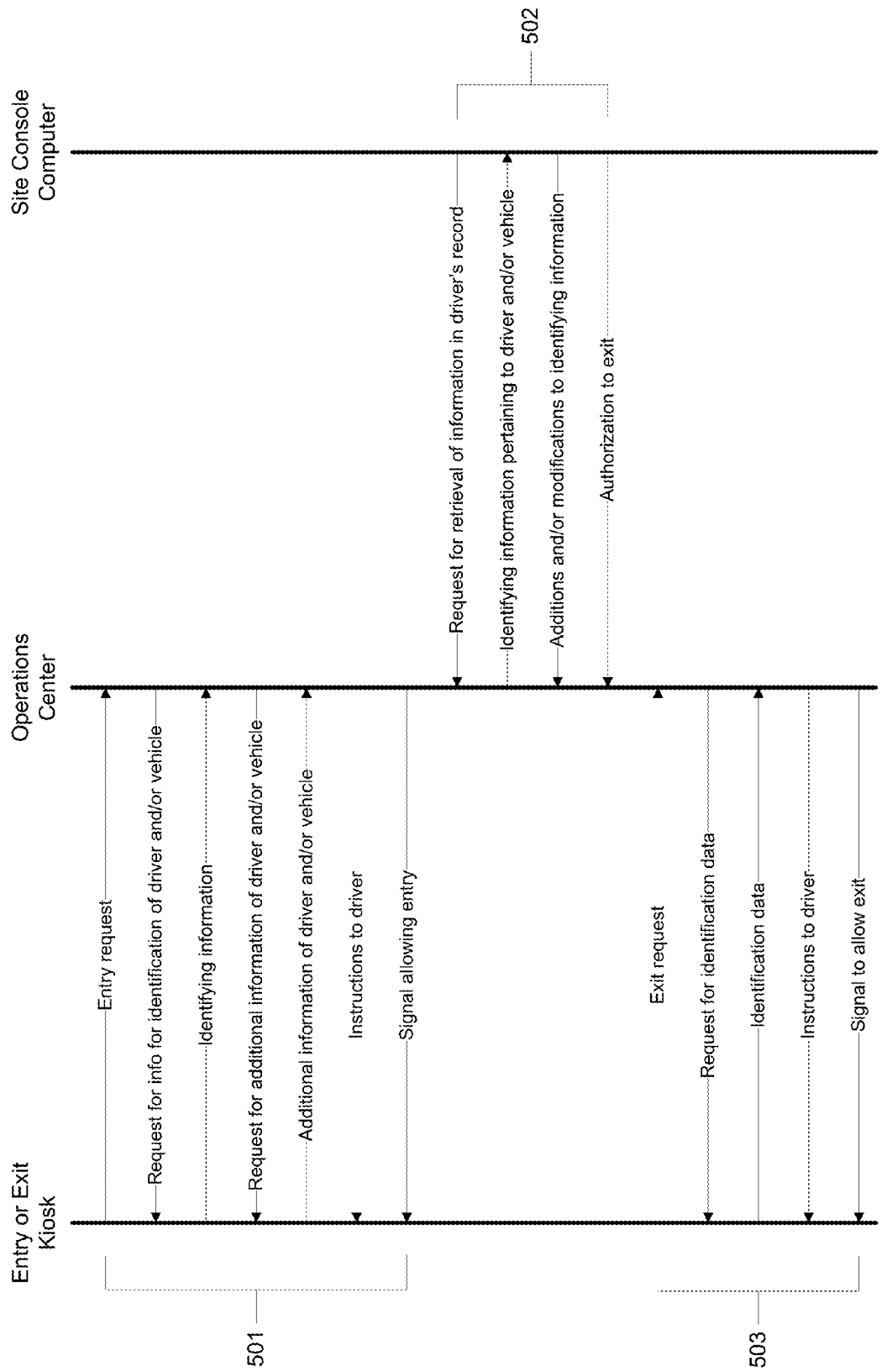
FIG. 5 is a diagram depicting communications between a kiosk, a remote operations center, and a site console computer.

FIG. 5 depicts communications occurring between the kiosks, operations center, and site console computer inside the secured area, in one embodiment. Identifier 501 identifies the various communications occurring between a driver at an entry kiosk and the operations center at the time a request for entry is made, which were described previously with reference to FIG. 4.

Once inside the secured area, a visiting vehicle and driver are under the supervision of site personnel. If the vehicle is a truck or other vehicle for carrying cargo, site personnel oversee the unloading and loading of any cargo of the vehicle. If cargo loaded onto a vehicle to be carried out of the secured area is particularly sensitive or valuable, the site personnel may ensure that the trailer of the vehicle or other cargo-carrying portion cannot be easily opened, such as by sealing or locking the trailer.

When site personnel ascertains that a vehicle is ready to depart the secured area, the site personnel conducts a check out process. Identifier 502 identifies example communications occurring between site console computer 112 and the operations center, during the check out process. From site console computer 112, site personnel retrieves, from database 109, the record for the driver of a departing vehicle. The site personnel can view the trailer identification number stored in the record. If the trailer identification number associated with the driver requires modification—such as if the driver's vehicle is departing the secured area with a different trailer from that with which the vehicle entered—the site personnel can update the record to reflect the identification number of the new trailer. If the outgoing vehicle is to leave the secured area with no trailer, the site personnel can update the record to reflect that there is no trailer associated with the vehicle. If the trailer was sealed after loading of cargo, the site personnel can update the record with an indication that the trailer has been sealed, such as with a seal identification number. If a weight measurement of the vehicle was obtained during entry, the site personnel can also update the weight measurement to reflect any changes in weight of the vehicle due to cargo being loaded or unloaded. At the conclusion of the check out process, the site personnel updates the record of the driver to indicate that the driver has authorization to exit. The foregoing modifications and additions to the information of the record are transmitted to the operations center and stored in database 109 by server 108. A time stamp of when the authorization to exit was given is also stored in the record.

If desired, the site personnel may issue to the driver of a vehicle authorized to exit the secured area a single-use exit token to facilitate an expedited exit from the secured area. In doing so, the site personnel provides the driver with an access card to be read by the RF reader 304 at an exit kiosk. Initially, the access card is disabled. At site console computer 112, the site personnel inputs credentials associated with the access card provided to the driver. Upon receipt of the credentials at the operations center, the credentials of the access card are associated with the record of the driver. To activate the access card, server 108 transmits credentials associated with the access card to RF reader 304 at the exit kiosk and a message instructing the RF reader 304 to enable use of the access card. In one embodiment, the message includes an expiration time upon which the access card will automatically be disabled. Security management software available in the field, such as Honeywell Pro-Watch™, may be utilized by server 108 for communication with RF reader 304 to facilitate the enablement of the access card. As the vehicle approaches the exit kiosk to exit the secured area, the driver of the vehicle can simply submit the access card to be read by RF reader 304. Upon determining that the credentials read from the access card have previously been enabled, RF reader 304 transmits a signal to deactivate the connected security barrier, thereby allowing the vehicle to exit the secured area. The operations center regularly polls the RF reader 304 to determine whether the access card has been used. Once it determines that access card has been used to exit the secured area, server 108 transmits a message instructing the RF reader 304 to disable use of the access card and updates the record of the driver stored in database 109 accordingly.

The use of a single-use exit token is advantageous for expediting a vehicle's exit out of a secured area, especially in situations when the outgoing vehicle has no trailer or cargo or is trusted by site personnel. If the driver of the departing vehicle was not provided with a single-use access card, or if the access card given to the driver is not usable due to a malfunction, the driver attempting to exit is required undergo a more rigorous and secure exit process, involving a request to exit being made and information pertaining to the driver and/or the vehicle being obtained at the exit kiosk for verification by the operations center. In FIG. 5, identifier 503 identifies the various communications occurring between a driver at an exit kiosk and the operations center at the time such a request for exit is made, which are further described with reference to FIG. 6.

Figure 6:
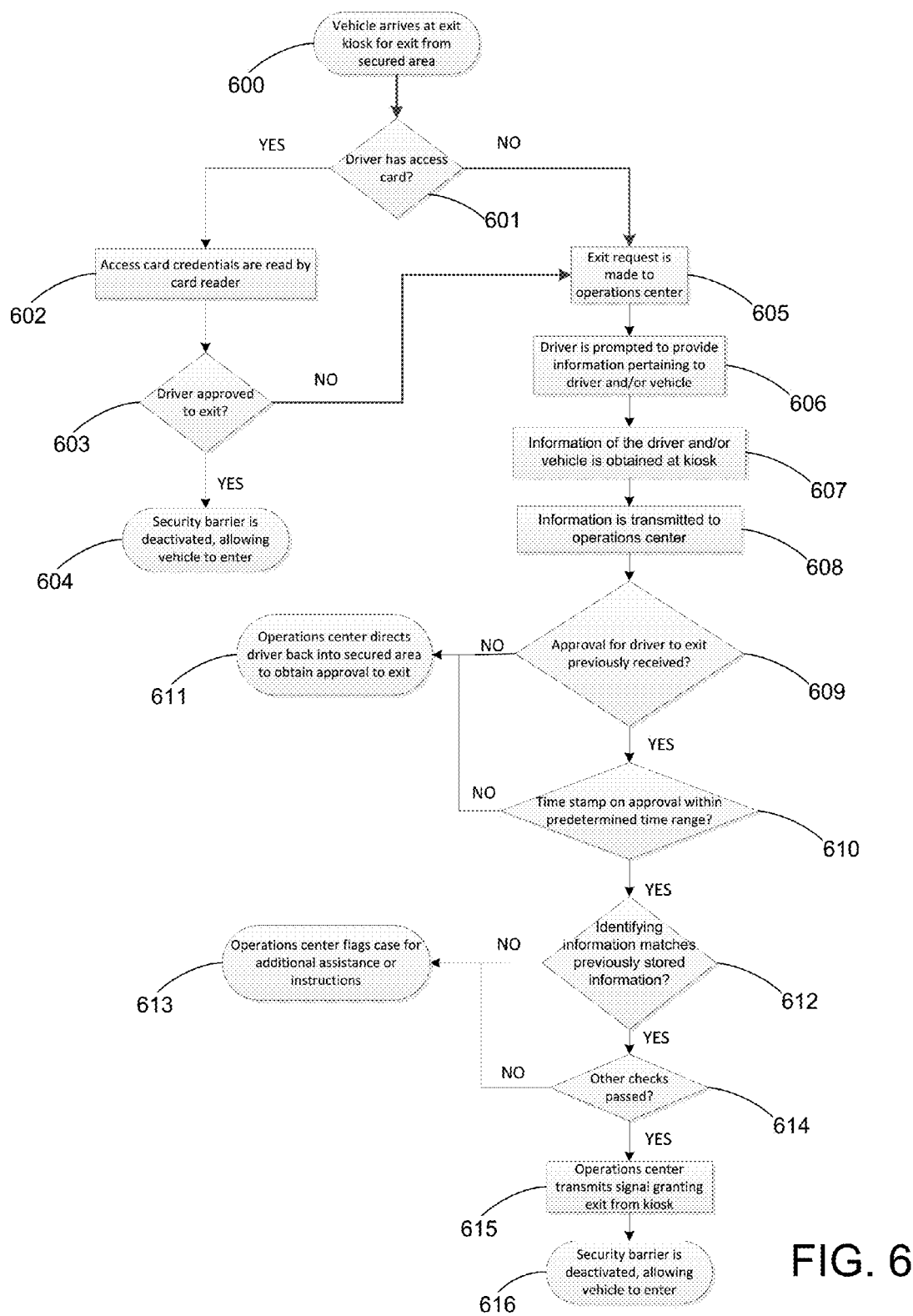
FIG. 6 is a flow diagram depicting a method for controlling exit out of a secured area.

A method of remotely controlling exit of a vehicle out of a secured area is described with reference to FIG. 6. At step 600, a vehicle seeking to exit the secured area arrives at an exit kiosk. At the time of the vehicle's arrival, a security barrier connected to the exit kiosk is activated, thus preventing the vehicle from proceeding further. In step 601, a vehicle whose driver possesses an access card for the secured area (including a single-use exit token) may proceed directly to submitting the access card to be read by the RF reader mounted on the exit kiosk (step 602). In step 603, a determination is made by the RF reader whether the access card is approved for exit out of the secured area. If so, in step 604, the RF reader initiates a signal to deactivate the security barrier connected to the exit kiosk, thus allowing the vehicle to exit the secured area.

If, in step 603, the RF reader determines that the access card is not approved for exit, the driver of the vehicle is required to make a request for exit to the operations center, as shown in step 605. A request for exit must also be made if, in step 601, the driver does not possess an access card that can be read by the exit kiosk's RF reader. A request for exit may be made in any one of the ways previously described for making a request for entry.

After the request for exit is made, the driver is prompted in step 606 to provide identifying information pertaining to the driver and/or vehicle via the various cameras, readers, and other input devices of the exit kiosk, as described above with reference to FIG. 3. In step 607, the identifying information pertaining to the driver and/or the vehicle is obtained by the respective input device at the exit kiosk. In step 608, the information is transmitted to server 108 in the operations center. The prompting for, obtaining, and transmission of the information may be performed manually by an operator, via automation, or by a combined method as previously described in connection with the entry access control method. Because the exit kiosk may contain the same types of input devices as the entry kiosk, the same types of identifying information can be obtained from the driver and the vehicle during entry as during exit. Some or all of the identifying information obtained at the time of the exit request is compared to the information previously obtained and stored to confirm the identities of a driver and vehicle who is seeking to exit. The comparison can help ensure, among other things, that the driver is departing with the correct vehicle and correct trailer. It is advantageous to obtain from the driver and the vehicle at the time of the request for exit at least the same types of information as collected upon the request for entry to increase the thoroughness of the matching process.

At step 609, the access control application determines, from accessing the record for the driver stored in database 109, whether the driver previously received authorization to exit the secured area by site personnel inside the secured area. If the record indicates that the driver was previously authorized to exit, in step 610, a further determination can be made as to whether the time stamp associated with when the authorization to exit was previously given falls within a predetermined time range. Performing these determinations is advantageous to increasing security of the site, as vehicles who have not been under the supervision of site personnel and recently checked out by site personnel are not permitted to exit. If either the driver was not previously authorized to exit in step 609 or the time stamp falls outside of the time range in step 610, the driver is prompted by the operations center in step 611 to return to the appropriate location in the secured area where site personnel can conduct the check out process and provide a new authorization for the driver to exit.

If the authorization to exit is present and the time stamp falls within the prescribed range, in step 612, a determination is then made whether the identifying information pertaining to the driver and/or the vehicle collected at the time of the request for exit matches the information previously stored in database 109. In one embodiment, the comparison in step 611 is performed by an operator at the operations center by retrieving information previously stored in database 109 and manually determining whether it matches the information collected upon the request for exit. For example, the previously stored driver's license information may be compared with the driver's license information obtained upon the request for exit. Images of the driver's face upon entry and upon exit may also be compared. The license plate information of the vehicle may also be compared. The trailer identification number captured upon exit may be compared with any updates to a previously stored trailer identification number made by site personnel while the vehicle was inside the secured area. Although the comparisons may be manually performed by an operator in one embodiment, in other embodiments server 108 may utilize computerized tools and algorithms available in the field to perform the comparisons. For example, image correlation techniques may be used to compare two digital facial images of the driver to determine whether a sufficient match exists. If a sufficient match does not exist, additional assistance or instruction may be provided by the operator to the driver in step 613.

Upon a determination that the identifying information stored in the database sufficiently matches with the identifying information collected upon exit, in step 614, the operator communicates with the driver to perform other checks for safety or security purposes. For example, the operator may check whether a seal on a trailer of the vehicle is intact, whether the driver is wearing a seat belt, and/or whether a GPS device is present in the vehicle. If the other checks in step 614 do not pass, additional assistance or instruction may be provided to the driver in step 613. If the identifying information sufficiently matches, and any additional checks are passed, in step 615, an electronic signal is transmitted from the operations center to the exit kiosk to deactivate the security barrier. In step 616, the security barrier is deactivated, allowing the vehicle to exit the secured area.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

The invention claimed is:

1. A system for controlling access of a vehicle to and from a secured area, comprising:
 a first kiosk coupled to a first security barrier, said first kiosk comprising:
  a first communications unit configured to transmit a request to enter the secured area and first identifying information associated with the vehicle over a communication network to a first location remote from the secured area; and
  a control mechanism configured to deactivate a first security barrier for controlling entry into the secured area when said first communications unit receives a first electronic signal over the communication network from the first location granting entry;
 a second kiosk coupled to a second security barrier, said second kiosk comprising;
  a second communications unit configured to transmit a request to exit the secured area and second identifying information associated with the vehicle over the communication network to the first location; and
  a control mechanism configured to deactivate a second security barrier for controlling exit from the secured area when said second communications unit receives a second electronic signal over the communication network from first location granting exit; and wherein a processor at the first location is configured to receive over the communication network an electronic authorization generated from a second location inside the secured area for the vehicle to exit the secured area, and to generate said second electronic signal upon a determination that the first identifying information matches the second identifying information.

2. The system of claim 1, wherein said processor is further configured to generate the second electronic signal if a time stamp associated with the electronic authorization is within a predetermined time range.

3. The system of claim 1,
 wherein the first kiosk further comprising:
  a first camera configured to obtain a first electronic image of a driver of the vehicle;
  a first card reader configured to obtain first identification data of the driver; and
  wherein the first identifying information associated with the vehicle comprises said first electronic image of the driver and said first identification data of the driver; and
 wherein the second kiosk further comprising:
  a second camera configured to obtain a second electronic image of the driver;
  a second card reader configured to obtain second identification data of the driver; and
  wherein the second identifying information associated with the vehicle comprises said second electronic image of the driver and said second identification data of the driver.

4. The system of claim 1,
 wherein the first kiosk further comprising a first image capturing device coupled to a first card reader, wherein said first image capturing device is configured to obtain a first electronic image of an identification card of the driver; and wherein the first identifying information associated with the vehicle comprises said first electronic image of the identification card; and
 wherein the second kiosk further comprising a second image capturing device coupled to a second card reader, wherein said second image capturing device is configured to obtain a second electronic image of the identification card of the driver; and wherein the second identifying information associated with the vehicle comprises said second electronic image of the identification card.

5. The system of claim 1, wherein said system further comprises:
 a first camera coupled to the first kiosk, wherein said first camera is configured to obtain a first electronic image of an identifier of the vehicle, and wherein the first identifying information associated with the vehicle comprises said first electronic image of the identifier of the vehicle; and
 a second camera coupled to the second kiosk, wherein said second camera is configured to obtain a second electronic image of the identifier of the vehicle, and wherein the second identifying information associated with the vehicle comprises said second electronic image of the identifier of the vehicle.

6. The system of claim 5, wherein the identifier of the vehicle comprises a license plate of the vehicle or an identifier associated with a trailer of the vehicle.

7. The system of claim 1, wherein the processor is further configured to apply a digital image correlation technique to determine the first identifying information matches the second identifying information.

8. The system of claim 1,
wherein the first kiosk further comprising:
a first bar code scanner configured to obtain a first bar code of the vehicle or of a driver of the vehicle; and
wherein the first identifying information associated with the vehicle comprises said first bar code; and
wherein the second kiosk further comprising:
a second bar code scanner configured to obtain a second bar code of the vehicle or of the driver of the vehicle;
wherein the second identifying information associated with the vehicle comprises said second bar code.

9. The system of claim 1, wherein said system further comprises
a first scale coupled to the first kiosk, wherein said first scale is configured to obtain a first weight measurement of the vehicle, and wherein the first identifying information associated with the vehicle comprises said first weight measurement; and
a second scale coupled to the second kiosk, wherein said second scale is configured to obtain a second weight measurement of the vehicle, and wherein the second identifying information associated with the vehicle further comprises said second weight measurement; and
wherein the processor is further configured to receive, over the communication network, from said second location inside the secured area, an updated weight measurement of the vehicle and to update the first weight measurement with the updated weight measurement so that the determination that the first identifying information matches the second identifying information comprises a determination that the updated weight measurement matches the second weight measurement.

10. The system of claim 1, wherein said system further comprises:
a first communications system coupled to the first kiosk configured to enable two-communication between a driver of the vehicle and the first location; and
a second communications system coupled to the second kiosk configured to enable two-communication between the driver of the vehicle and the first location.

11. The system of claim 10, wherein each of said first communications system and second communications system is a voice communications system.

12. The system of claim 10, wherein each of said first communications system and second communications system comprises an input device and a screen display.

13. A method for remotely controlling access of a vehicle to and from a secured area, comprising:
receiving, at a first location remote from the secured area, over a communication network, a request to enter the secured area at a first security barrier;
receiving, at the first location, over the communication network, first identifying information obtained at a first kiosk coupled to said first security barrier;
storing, at the first location, the first identifying information;
generating, at the first location, an electronic signal to deactivate said first security barrier;
receiving, at the first location, over the communication network, a request to exit the secured area at a second security barrier;
receiving, at the first location, over the communication network, second identifying information obtained at a second kiosk coupled to said second security barrier;
determining, at the first location, that an authorization generated from a second location inside the secured area for the vehicle to exit the secured area has been electronically received over the communication network;
determining, at the first location, that the first identifying information matches the second identifying information; and
generating, at the first location, an electronic signal to deactivate said second security barrier.

14. The method of claim 13, further comprising:
determining, at the first location, that a time stamp associated with the authorization is within a predetermined time range before generating the electronic signal to deactivate the second security barrier.

15. The method of claim 13,
wherein the first identifying information comprises:
a first electronic image of a driver of the vehicle obtained by a first camera mounted on the first kiosk; and
a first identification data of the driver obtained by a first card reader mounted on the first kiosk; and
wherein the second identifying information comprises:
a second electronic image of the driver obtained by a second camera mounted on the second kiosk; and
a second identification data of the driver obtained by a second card reader mounted on the second kiosk.

16. The method of claim 13,
wherein said first identifying information comprises a first electronic image of an identification card of the driver obtained by a first image capturing device coupled to a first card reader mounted on the first kiosk; and
wherein said second identifying information comprises a second electronic image of an identification card of the driver obtained by a second image capturing device coupled to a second card reader mounted on the second kiosk.

17. The method of claim 13,
wherein said first identifying information comprises a first electronic image of an identifier of the vehicle obtained by a first camera coupled to the first kiosk; and
wherein said second identifying information comprises a second electronic image of the identifier of the vehicle obtained by a second camera coupled to the second kiosk.

18. The method of claim 17, wherein the identifier of the vehicle comprises a license plate of the vehicle or an identifier associated with a trailer of the vehicle.

19. The method of claim 13, further comprising determining, at the first location, that a seal on a trailer of the vehicle is intact before generating the electronic signal to deactivate the second security barrier.

20. The method of claim 13, wherein the determination that the first identifying information matches the second identifying information is made using a digital image correlation technique.

21. The method of claim 13,
wherein the first identifying information comprises:
a first bar code of the vehicle or of a driver of the vehicle obtained by a first bar code scanner coupled to the first kiosk; and
wherein the second identifying information further comprises:
a second bar code of the vehicle or of the driver of the vehicle obtained by a second bar code scanner coupled to the second kiosk.

22. The method of claim 13,
wherein the first identifying information comprises:
a first weight measurement of the vehicle obtained by a first scale coupled to the first kiosk; and
wherein the second identifying information further comprises:
a second weight measurement of the vehicle obtained by a second scale coupled to the second kiosk; and
further comprising the steps of:
receiving, over the communication network, from said second location inside the secured area, an updated weight measurement of the vehicle;
updating, using a processor, the first weight measurement with the updated weight measurement so that the step of determining that the first identifying information matches the second identifying information comprises determining that the updated weight measurement matches the second weight measurement.

23. The method of claim 13, further comprising:
receiving, at the first location, over the communication network, additional information from a driver of the vehicle obtained at a first kiosk coupled to said first security barrier; and
transmitting, from the first location, over the communication network, requests or instructions to the driver;
wherein the steps of receiving additional information and transmitting requests or instructions are performed before the first security barrier is deactivated.

24. The method of claim 23,
wherein the additional information is obtained via a voice communication system connected to the first kiosk.

25. The method of claim 23,
wherein the additional information is obtained via an input device coupled to the first kiosk and the instructions to the driver are displayed on a screen display.

26. The method of claim 13, further comprising determining, at the first location, that a GPS device is present in the vehicle before generating the electronic signal to deactivate the second security barrier.

27. A system for controlling access of a vehicle to and from a secured area, comprising:
a first kiosk coupled to a first security barrier, said first kiosk comprising:
a first communications unit configured to transmit a request to enter the secured area and first identifying information associated with the vehicle over a communication network to a first location remote from the secured area; and
a control mechanism configured to deactivate a first security barrier for controlling entry into the secured area when said first communications unit receives a first electronic signal over the communication network from the first location granting entry;
wherein a processor at the first location is configured to store said first identifying information, to receive over the communication network first credentials of an exit token generated from a second location inside the secured area after the first identifying information is accessed from the second location, to associate the first identifying information with said first credentials, to generate an indication of approval to exit associated with said first credentials, and to remove the indication of approval to exit associated with said first credentials upon use of the exit token; and
a second kiosk coupled to a second security barrier, said second kiosk comprising;
a second communications unit configured to receive, over the communication network, said indication of approval to exit associated with said first credentials;
an exit token reader configured to read second credentials; and
a control mechanism configured to deactivate a second security barrier for controlling exit from the secured area, without accessing the first identifying information, when said second credentials correspond to said first credentials for which said indication of approval to exit has been received.

28. The system of claim 27,
wherein the communications unit of the second kiosk is further configured to receive an expiration time corresponding to the indication of approval to exit associated with the first credentials received from the first location; and
wherein the control mechanism of the second kiosk prevents deactivation of the second security barrier if the expiration time has elapsed.

29. A method for remotely controlling access of a vehicle to and from a secured area, comprising:
receiving, at a first location remote from the secured area, over a communication network, a request to enter the secured area at a first security barrier;
receiving, at the first location, over the communication network, first identifying information obtained at a first kiosk coupled to said first security barrier;
storing, at the first location, said first identifying information;
generating, at the first location, an electronic signal over the communication network to deactivate said first security barrier;
receiving, at the first location, over the communication network, first credentials of an exit token generated from a second location inside the secured area after the first identifying information is accessed from the second location;
associating, using a processor at the first location, the first identifying information with said first credentials;
generating, using the processor, an indication of approval to exit associated with said first credentials;
transmitting, from the first location, over the communication network, said indication of approval to exit to a second kiosk coupled to a second security barrier for deactivating the second security barrier, without accessing the first identifying information, when second credentials read by an exit token reader at the second kiosk correspond to said first credentials for which said indication of approval to exit has been received; and
removing, using the processor, said indication of approval to exit associated with the first credentials to prevent future use of the exit token.

30. The method of claim 29, further comprising the steps of:
receiving, at the first location, over the communication network, a time stamp corresponding to the first credentials of the exit token;
transmitting, from the first location, over the communication network, an expiration time corresponding to the first credentials to the second kiosk for preventing deactivation of the second security barrier if the expiration time has elapsed.

* * * * *